(12) United States Patent
Agari

(10) Patent No.: US 6,257,766 B1
(45) Date of Patent: Jul. 10, 2001

(54) LINEAR MOTION GUIDE UNIT WITH LUBRICATING MEANS

(75) Inventor: Norimasa Agari, Gifu-ken (JP)

(73) Assignee: Nippon Thompson Co., Ltd, Tokyo (JP)

( * ) Notice: Subject to any disclaimer, the term of this patent is extended or adjusted under 35 U.S.C. 154(b) by 0 days.

(21) Appl. No.: 09/413,593

(22) Filed: Oct. 6, 1999

(30) Foreign Application Priority Data

Nov. 13, 1998 (JP) .................................................. 10-324285

(51) Int. Cl.⁷ ............................. F16C 29/06; F16C 33/00
(52) U.S. Cl. ................................................. 384/45; 384/15
(58) Field of Search ............................... 384/14, 15, 45, 384/44, 43; 184/5, 100

(56) References Cited

U.S. PATENT DOCUMENTS

| | | | |
|---|---|---|---|
| 4,611,972 | * 9/1986 | Andrea | 416/214 |
| 5,267,796 | * 12/1993 | Nonaka et al. | 384/43 X |
| 5,492,413 | * 2/1996 | Tsukada | 384/12 |
| 5,570,958 | * 11/1996 | Tsukada | 384/45 |
| 5,590,965 | * 1/1997 | Yabe et al. | 384/15 |
| 5,678,927 | * 10/1997 | Yabe et al. | 384/15 X |
| 5,694,811 | * 12/1997 | Tsukada | 384/43 X |
| 6,024,490 | * 2/2000 | Shirai | 384/15 X |
| 6,082,899 | * 7/2000 | Suzuki et al. | 384/45 X |
| 6,123,457 | * 9/2000 | Suzuki et al. | 384/45 X |

FOREIGN PATENT DOCUMENTS

| | | |
|---|---|---|
| 9-126235 | 5/1997 | (JP) . |
| 10-184683 | 7/1998 | (JP) . |
| 10-205534 | 8/1998 | (JP) . |
| 11-082507 | 3/1999 | (JP) . |
| 11-093952 | 4/1999 | (JP) . |

* cited by examiner

Primary Examiner—Charles A Marmor
Assistant Examiner—Roger Pang
(74) Attorney, Agent, or Firm—Browdy and Neimark

(57) ABSTRACT

A linear motion guide unit is provided with lubricating means that is compact in size and may continue to apply lubricant to raceway grooves on the track rail for a long service life. The lubricating means has a case containing therein lubricant and having an opening that is closed with a lubricating plate assembly for applying the lubricant onto the raceway grooves. A slider movable along the track rail has mounted at one end thereof with a case, made therein with a lubricant reservoir, by clamping bolts. The opening of the case is closed with the lubricating plate assembly composed of a lubricant-containing member of sintered porous resinous component, and a core metal for reinforcing the lubricant-containing member. The lubricant in the reservoir soaks into the lubricant-containing member and oozes onto the raceway grooves of the track rail through convexities of the lubricant-containing member, thereby lubricating the confronting raceway grooves of the track rail and the sliding element.

16 Claims, 9 Drawing Sheets

LINEAR MOTION GUIDE UNIT WITH LUBRICATING MEANS

BACKGROUND OF THE INVENTION

1. Field of the Invention

The present invention relates to a linear motion guide unit with lubricating means, which is applicable to industrial robots, semiconductor manufacturing apparatus, machine tools and the like to lubricate the relatively sliding parts and components.

2. Description of the Prior Art

The linear motion guide units have been conventionally used incorporated in the parts or components for reciprocating motion in fields as diverse as the industrial robots, semiconductor manufacturing machines, inspection instruments, machine tools or the like, and further developed to answer the needs for precision, high-speed, miniaturization or the like. The recently remarkable development in mechatronics technology extensively requires linear motion guide units that may meet with needs of maintenance-free, especially, the self-lubrication of long service life on its relatively movable sliding areas, along with miniaturization, high precision and high speed in operation.

FIGS. 14 and 15 show an example of prior linear motion guide units.

The linear motion guide unit in FIG. 14 is primarily comprised of a track rail 2 and a sliding element, or a slider 1, riding the track rail 2 astride for sliding movement. The track rail 2 is formed on lengthwise side surfaces 3 thereof with raceway grooves 4. The slider 1 may move on the track rail 2 by virtue of rolling elements running through the raceway groove 4. The track rail 1 has on lengthwise upper surface 14 thereof openings 13 spaced from each other. The track rail 2 is fixed to a mounting base 20 such as beds, platforms, working tables or the like by screwing bolts through the openings 13 of the track rail 2 and matching openings in the mounting base 20. The slider 1 has a casing 5 movable with respect to the track rail 2, and end caps 6 attached to the opposing ends of the casing 5. Provided on the upper surface of the casing 5 are openings 19 for fixture to mount other appliances, parts or the like on the slider 1.

Both the casing 5 and end caps 6 are made on the lower surfaces thereof with recesses 10, where the casing 5 and end caps 6 may sit astride the track rail 2 for free movement. The recesses 10 are each made with raceway grooves 9 in opposition to the raceway grooves 4 on the track rail 2. The rolling elements 7 contained in the casing 5 run through load areas of raceways defined between the confronting raceway grooves 4 and 9. Retainer bands 18 are provided in the casing 5 so as to embrace therolling elements 7 to thereby prevent the rolling elements 7 from falling out of the casing 5. Bottom seals 8 are affixed to the lower surfaces of the slider 1 for closing clearances between the track rail 2 and slider 1.

The end caps 6 are provided therein with members for scooping up the rolling elements 7 from the raceway grooves 4 on the track rail 2, and turnarounds for circulating the rolling elements 7. Mounted on the end caps 6 are end seals 17 for ensuring the sealing performance between the track rail 2 and the lengthwise opposing ends of slider 1. The end caps 6 are connected to the opposing ends of the casing 5 by means of bolts 21, which are screwed into their matching holes. The raceways defined by the confronting raceway grooves 4, 9, turnarounds formed in the end caps 6 and return passages 12 formed in parallel with the raceway grooves 9 in the casing 5, in combination, constitute endless-circulating paths for the rolling elements 7. Even though the rolling elements 7 are under loaded condition in the raceways, rolling-contact of the rolling elements 7 with the raceway grooves 4, 9 may help ensure the smooth movement of the slider 1 relative of the track rail 2.

To lubricate the raceways where the rolling elements 7 run through, grease or lubricating oil is usually employed. In case of grease, it is applied to the raceways through grease nipples 11 that are mounted to the end caps 6, extending through the end seals 17. In contrast, lubricating oil is supplied to the raceways through pipe joints, which are used substituting for the grease nipples.

Japanese Patent Laid-Open No. 205534/1998, which is a senior co-pending application, discloses a linear motion guide unit having for its object to provide a maintenance-free lubrication system for the raceways, as shown in FIG. 15. In the linear motion guide unit cited above, lubricating plate assemblies 15 having lubricant-containing members are attached over each outer end surface of the slider 1.

The linear motion guide unit in FIG. 15 is substantially identical in structure with that in FIG. 14. To that extent, like parts or components have been given the same reference characters, so that the previous description will be applicable.

Attached on the casing 5 of the slider 1 by the clamping bolts 21 are reinforcing washers 16 and lubricating plate assemblies 15 having therein lubricant-containing members, along with the end caps 6 and end seals 17. The reinforcing washers 16 each are of a steel plate formed into a substantially inverted U-shape, which is fit to the outward contour of the end cap 6. The washers are arranged in no contact with the track rail 2.

The lubricating plate assembly 15 is also formed in a substantially inverted U-shape, which is fit to the outward contour of the end cap 6. The lubricating plate assembly 15 includes therein the lubricant-containing member made of sintered resinous component. The lubricant-containing member is provided on the inside thereof with convexities, which are formed in adaptation with the cross section of the track rail 2 so as to come in sliding contact with its associated confronting raceway groove of the track rail 2. For constant supply of the lubricant from the lubricant-containing members 15 to the raceway grooves 4 on the track rail 2, the lubricant-containing members 15 are forced against the raceway grooves 4 on the track rail 2 by spring effect of resilient metal casing covering around the outer peripheries of the lubricant-containing members of the lubricating plate assemblies 15.

Application of lubricant from the lubricant-containing members of the lubricating plate assemblies 15 onto the raceways of the track tail 2 has an advantage of providing the self-lubrication system in which the raceways defined between the confronting raceway grooves 4, 9 of the track rail 2 and the slider 1 are kept in maintenance-free for lubrication continuously whenever the lubricant is supplied. After the lubricant has been consumed, the lubricant-containing members in the lubricating plate assemblies 15 may be replenished with other lubricant to thereby prolong the service period to the next chance of replenishment.

Other linear motion guide units with lubricating plate assemblies have been developed and disclosed in, for example, Japanese Patent Laid-Open Nos. 82507/1999 and 93952/1999, which are senior co-pending applications.

Moreover, Japanese Patent Laid-Open No. 126235/1997 disclose a linear motion guide bearing-unit having lubricant reservoir means made of a rubber or synthetic resin block containing therein lubricant. The lubricant reservoir means is attached to the linear motion guide unit by connectors to apply continuously the lubricant for a prolonged period of service life, as the slider moves along the track rail by virtue of the rolling elements. The lubricant reservoir means is, for example, arranged between two juxtaposed sliders so that the lubricant reservoir means is forced alternately in opposing directions by means of either one of the sliders to move along the track rail, whereby the lubricant oozed from the reservoir means may be applied little by little onto the track rail to lubricate the rolling elements of the linear motion guide unit.

Disclosed in Japanese Patent Laid-Open No. 184683/1998 is lubricant-supply means having lubricant-supply members that are mounted on sliding members so as to apply the lubricant to the surface of a guide shaft. The lubricant-supply member is comprised of a lubricant applicator contained in a casing, a lubricant storage arranged adjacent to the lubricant applicator so as to hold the lubricant therein and feed the lubricant to the lubricant applicator, and control means of a flow adjusting diaphragm to regulate the amount of lubricant to be fed from the lubricant storage to the lubricant applicator.

Nevertheless, as the linear motion guide units become recently more common in diverse fields of wide applications, they are increasingly used under unfavorable operating conditions or adverse environments, where the replenishment of lubricant is made even tougher. In recent years much attention has been thus given the development of the linear motion guide units that would be long-lasting as for maintenance-free with no replenishment of lubricant. For prolonging the service life available for the next replenishment of lubricant, it may be considered to render the lubricating plate double or triple. Nevertheless, the design has drawbacks of making the lubricating means large in size as well as expensive in production cost.

Thus, even if the lubricating means may be made compact in size by assembling together both of a lubricant-storage and lubricant-apply components into a single case, it will be expected to render the lubricating means miniature while ensuring a enough storage capacity for lubricant, which makes it possible to provide the prolonged period of maintenance free as for lubrication.

SUMMARY OF THE INVENTION

The present invention has for its primary object to overcome the drawbacks as described above, and to provide a linear motion guide unit provided with lubricating means that may be compactly incorporated to the slider, where both of a lubricant-storage and lubricant-apply components are integrated together into a compact case, so as to have either of lubricant-storage and lubricant-apply functions. The lubricating means of the present invention helps ensure the prolonged period of maintenance-free service life available with no replenishment of lubricant, and also may be simply installed into the presently available linear motion guide unit with only a little modification.

The present invention is concerned with a linear motion guide unit comprising a track rail provided at lengthwise side surfaces thereof with first raceway grooves, a sliding element movable with relative to the track rail and having second raceway grooves confronting the first raceway grooves, and lubricating means for lubricating the confronting first and second raceway grooves, wherein the lubricating means is comprised of a case provided therein with a lubricant reservoir containing lubricant and riding the track rail astride, and a lubricating plate assembly having a lubricant-containing member that is mounted on the case to lid the lubricant reservoir and comes in sliding contact with the first raceway grooves, so that the lubricant contained in the lubricant-containing member is applied to the first raceway grooves while the lubricant-containing member is replenished with the lubricant in the lubricant reservoir.

The lubricating plate assembly attached to the case is to lid the lubricant reservoir containing therein the lubricant. At the same time, the lubricating plate assembly comes in direct contact with the lubricant contained in the case, while also comes in sliding contact with the first raceway grooves on the track rail thereby applying the lubricant, replenished from the reservoir, onto the first raceway grooves. That is to say, as the slider moves along the track rail, the lubricating means also moves in sliding contact with the first raceway grooves to apply the lubricant onto the first raceway grooves. The lubricant thus applied onto the first raceway grooves spreads over the second raceway grooves, resulting in lubricating the confronting raceway grooves. As the lubricant in the lubricant-containing member in the lubricating plate assembly is consumed depending on the operation of the linear motion guide unit, the lubricant-containing member may be constantly replenished with the lubricant stored in the case. The lubricant may continue constantly to lubricate the raceway grooves until it will spend all the lubricant, which is previously impregnated in the lubricant-containing member and stored in the case 27.

In an aspect of the present invention, a linear motion guide unit is provided wherein the case has an opening facing the lubricant reservoir at fore-and-aft one end of the sliding element, and the lubricant reservoir is closed with the lubricating plate assembly fitted to the opening. Moreover, shoulders are provided between the opening and the lubricant reservoir to make the reservoir smaller than the opening, where a releasing coupling is provided to fit the lubricating plate assembly. The lubricating plate assembly fitted in the opening in the case blocks liquid tightly the reservoir so that the lubricant may be kept against leakage out of the case, except the application to the raceway grooves through the lubricating plate assembly. The releasing coupling structure provided at the opening the case by the shoulders makes it possible to fit the lubricating plate assembly in the opening in flush with the end surface of the case, so that the lubricating means is made compact in size as well as simple in appearance.

In another aspect of the present invention, a linear motion guide unit is provided wherein the lubricant reservoir in the case is divided into reservoir halves that are positioned in correspondence with the first raceway grooves of the track rail on either side of a plane extending along a reciprocating direction of the sliding element. The case is made of synthetic resins from the viewpoint of workability and production cost. The interior of the case is divided by a central partition into two reservoir halves for containing therein the lubricant. Dividing the lubricant reservoir into the reservoir halves is to help ensure the application of the lubricant from the lubricating plate assembly to the raceway grooves on the track rail, irrespective of operating posture of the linear motion guide units. The divided reservoir halves make it possible to make the lubricant-storing medium identical in structure and shape with one another, resulting in reducing the production cost of the medium.

In another aspect of the present invention, a linear motion guide unit is provided wherein the lubricating plate assembly includes a lubricant containing member of porous structure and a core metal adhered to the lubricant-containing member at a surface thereof opposing to the side of the lubricant reservoir. The lubricant-containing member is affixed onto the core metal by piecing pins made on the core metal. As an alternative, the lubricant-containing member may be affixed onto the core metal by adhesive.

In a further aspect of the present invention, a linear motion guide unit is provided wherein the lubricant-containing member is of a sintered porous resinous component, which is fabricated by heating finely powdered synthetic resin of ultrahigh molecular weight polymers under pressure in a design mould and wherein the lubricant-containing member has convexities that extend through cut-away areas formed at the opening of the case and come in sliding contact with the first raceway grooves on the track rail.

The lubricant is of grease or lubricating oil, and contained in the lubricant reservoir in the case in the form of fluidic condition or a condition where the lubricant is held in lubricant-storing medium. Moreover, the fluidic lubricant contained in the reservoir of the case is mixed with any one selected from powdery resins, pulverized metals and felts.

In another aspect of the present invention, a linear motion guide unit is provided wherein the lubricating means is mounted on the sliding element or a mount that is fixed to the sliding element in unison. The sliding element includes a casing having the second raceway grooves, rolling elements running through between the confronting first and second raceway grooves, and end caps and end seals attached onto the opposite ends of the casing, while the lubricating means is connected arranged between the associated end cap and end seal. Since the lubricating means is to apply the lubricant onto the first raceway grooves when moving along the track rail, the lubricating means is attached directly on the sliding element or a mount that is affixed to the sliding element so as to move in unison. The end seal may be available commonly for closing the opposing end of the sliding element.

According to the linear motion guide unit constructed as described above, the component to store the lubricant is provided by the case while the component to apply the lubricant onto the track rail is provided by the closure member for the opening of the case. This makes it possible to constitute the lubricating means compact in size, which is effective to prolong the service life during which the lubricant may be incessantly applied to track rail as well as the slider, resulting in accomplishing the long-lasting maintenance-free service as to lubrication. Moreover, the lubricating means of the present invention may be used incorporated in the conventional guide unit without substantial changes in principal specification. That is, this lubricating means may be widely applicable to the linear motion guide units having the track rail equal in the standard, because the case and the lubricating plate assembly may be commonly employed even if the sliding element is different in type and size. In addition, the lubricating means of the present invention has an advantage of not having to make the liner motion guide unit large in size.

According to the present invention, the lubricant may be applied incessantly little by little from the surface of the lubricant-containing member onto the first raceway grooves on the track rail and, therefore, the self-lubrication may be carried out even under the severe operating environment with no fear of lubrication failure, thereby helping ensure the reliable lubrication. In the lubricating means of the present invention, all the lubricant-containing member and lubricant are handled encapsulated in the case and, therefore, the handling operations such as assembly and disassembly of end caps and end seals with the casing and preservation thereof may become simple. The lubricant and lubricant-containing member to be sealed in the case are combined such that they are comfortable with each other in a condition where the lubricant soaks into the sintered porous resinous component. Moreover, the lubricant to be charged in the lubricating means is selected by the user, rechargeable and easy to handle and to modify in specification. Finally, liquid-tight closing of the case results in the dust-proof of the lubrication to thereby keep the environment clean.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 14:
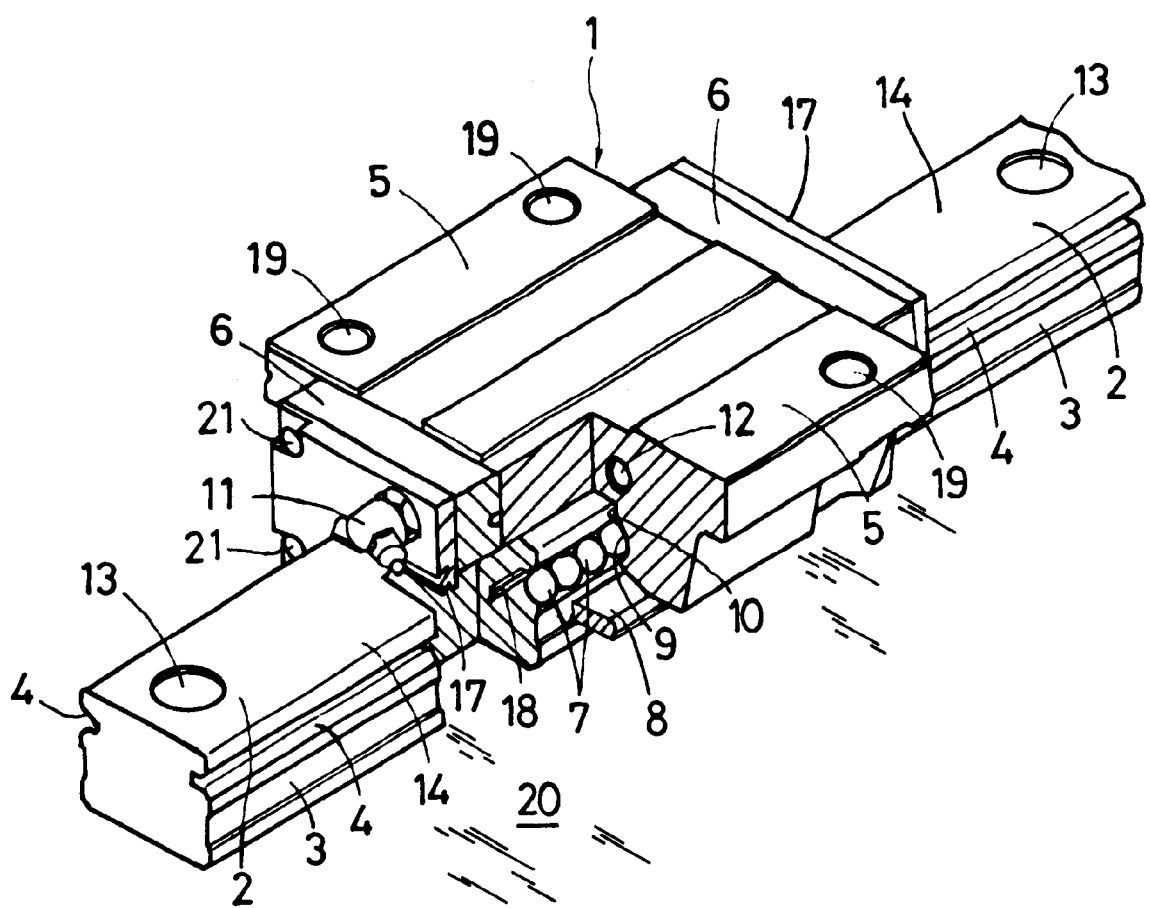
FIG. 14 is a perspective view, partially broken away, of a conventional linear motion guide unit.
Figure 15:
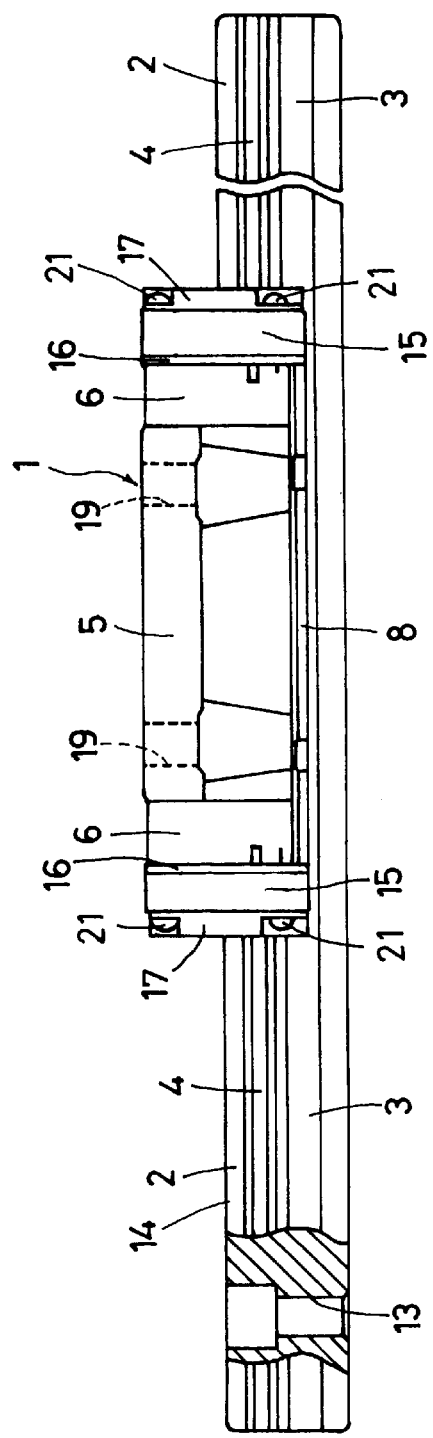
FIG. 15 is a side elevation showing another conventional linear motion guide unit.

Referring now in detail to the drawings, the linear motion guide unit according to the present invention will be explained below. Compared with the prior linear motion guide unit in FIGS. 14 and 15, the first embodiment of the present invention shown in FIGS. 1 to 5 is identical in structure, except for lubricating means 25 and, therefore, like parts or components have been given the same reference characters, so that the previous description will be applicable.

The linear motion guide unit of the present invention is comprised of the track rail 2 provided with raceway grooves, or first raceway grooves 4, of arced recess in cross section, and the slider 1 mounted astride the track rail 2 for sliding movement. The slider 1 includes therein the casing 5 and end caps 6. The slider 1 is bored at 17 for fixing bolts while the track rail 2 has matching holes 13.

All the casing 5 and the end caps 6 are identical in their interior structures with that of the prior slider. Shown in FIG. 14. The casing 5 is provided therein with raceway grooves, or second raceway grooves, and return passages, where the rolling elements run through load areas. The slider 1 is also provided with retainer bands while the end caps 6 have therein turnarounds. The rolling elements 7 run through endless-circulating paths that comprise the load areas, turnarounds and the non-loaded return passages. The slider 1 may move along and with respect to the track rail 2 by virtue of the rolling elements that run through the load areas. Bottom seals are mounted to the bottom surfaces of both the casing 5 and the end caps 6.

Figure 1:
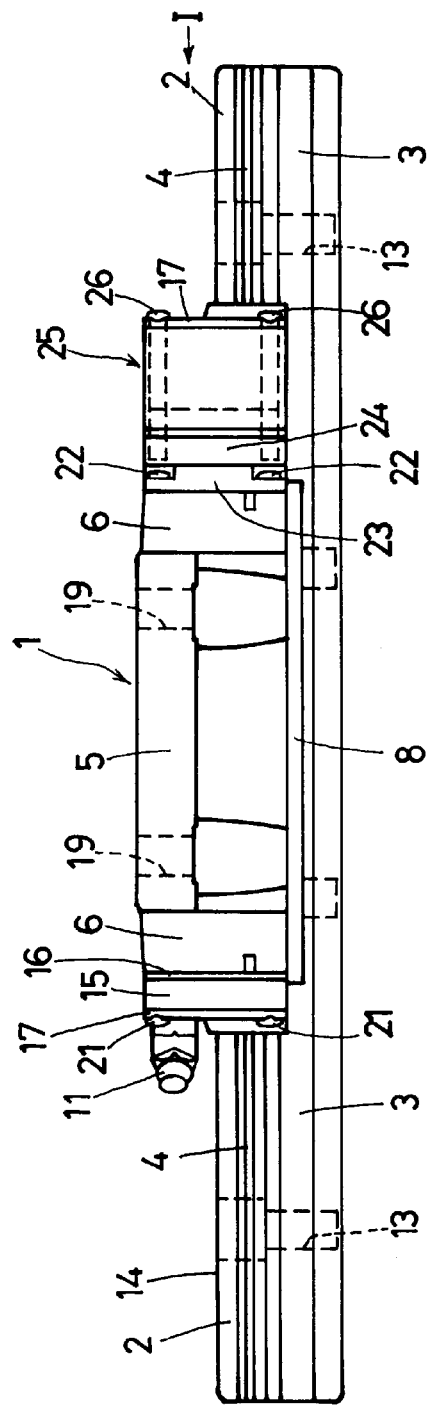
FIG. 1 is a side elevation showing a preferred embodiment of a linear motion guide unit according to the present invention.
Figure 2:
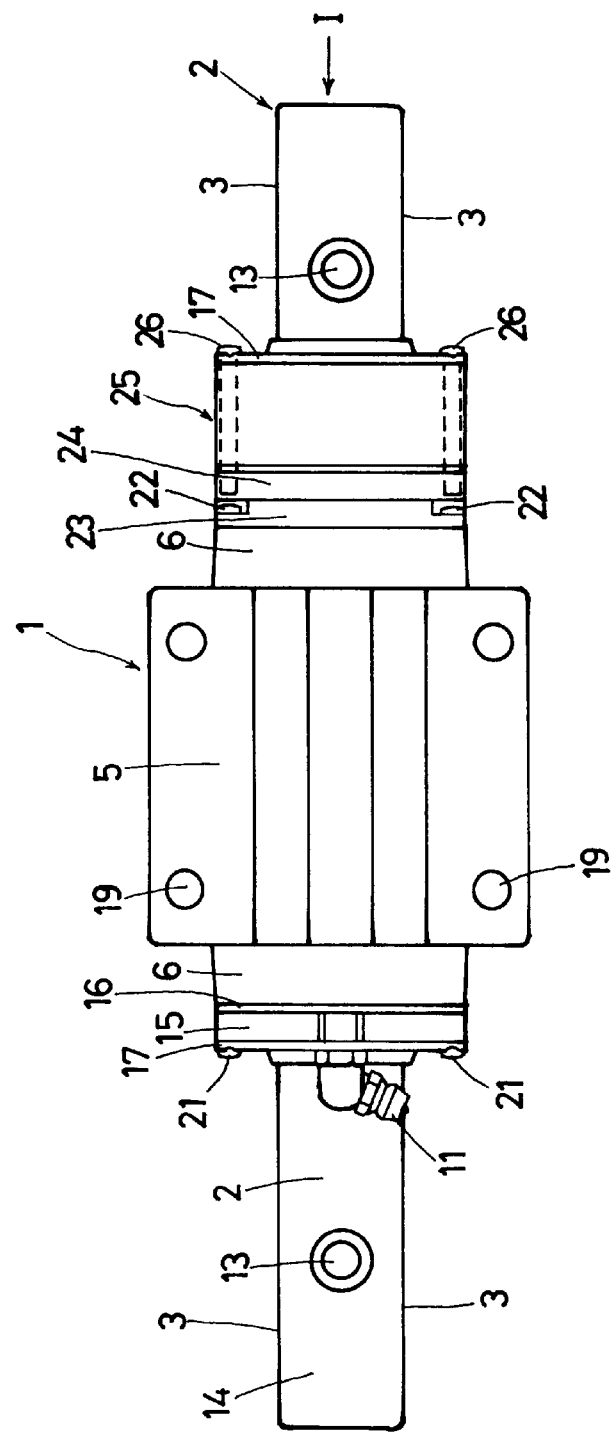
FIG. 2 is a top plan view of the linear motion guide unit shown in FIG. 1.
Figure 3:
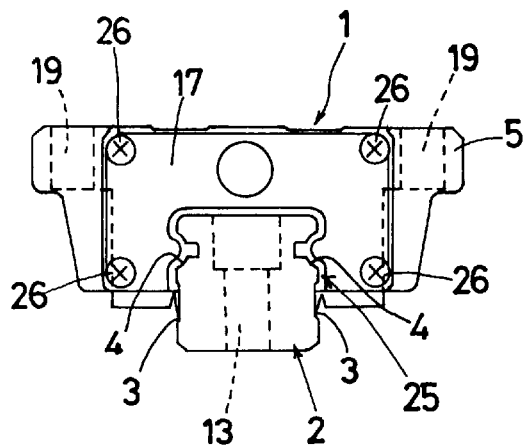
FIG. 3 is a front elevation of the linear motion guide unit in FIGS. 1 and 2, viewed along an arrow I.

As shown in FIGS. 1 and 2, a lubricating plate assembly 15 with a core metal is mounted on the end surface of the end cap 6 through the reinforcing washer 16, which is arranged on the side of the grease nipple 11. In order to protect the interior of the slider 1 from the inversion of dust and debris, a end seal 17 is attached on the end surface of the lubricating plate assembly 15 for relative movement along the track rail 2. The end seal 17 is to close a clearance between the track rail 2 and the slider 1 at one of lengthwise opposing ends of the slider 1. All the end seal 17, the lubricating plate assembly 15 and the end cap 6 are connected to the casing 5 by means of the fixing bolts 21, which fit in matching holes in the casing 5, extending through holes in them. The washer 16 is made of steel plate to protect both of the end cap 16 and the lubricating plate assembly 15 against compressive deformation when tightened by the fixing bolts 21.

The lubricating plate assembly 15 comes in sliding contact with the raceway grooves 4 of the track rail 2, resulting in lubricating the raceway grooves 4. The lubricating plate assembly 15 is comprised of a sintered resinous component having porous structure in which voids are impregnated with lubricant. The lubricating plate assembly 15 has on the inner periphery thereof convexities raised up inwardly so as to come in sliding contact with at least the raceway grooves 4 on the track rail 2. Thus, as the slider 1 move along the track rail 2, any lubricant of grease and lubricating oil contained in the sintered resinous component may be applied on the raceway grooves 4 continuously whenever the lubricating plate assembly 15 comes in sliding contact with the raceway grooves 4. The detail of the lubricating plate assembly 15 constructed as described just above is disclosed, for example, in Japanese Patent Laid-Open No. 205534/1998.

The feature of the first embodiment is resides in a lubricating means 25 that is arranged on the end surface of the end cap 6, where there is installed no grease nipple 11, to help ensure the self-lubrication for the raceway grooves 4 of the track rail 2 for a prolonged service life.

A washer 23 is arranged on the end surface of the end cap 6 to fit the end cap 6 onto the casing 5, so that the end cap 6 is mounted interposed between the washer 23 and the casing 5 by fixing bolts 22 driven or screwed into the casing 5. The washer 23 has therein threaded holes, not shown, where fixing screws fit to affix another washer 24 onto washer 23. The lubricating means 25 is attached onto the slider 1 together with an end seal 17 by means of clamping molts 26, which stretch into matching holes in the washer 24. Like the end seal 17 arranged near the grease nipple 11, the second end seal 17 is also arranged on the outer surface of the lubricating means 25 in such a manner as to move relatively of the track rail 2, thereby protecting the interior of the slider 1 against the invasion of dust and dirt.

Figure 4:
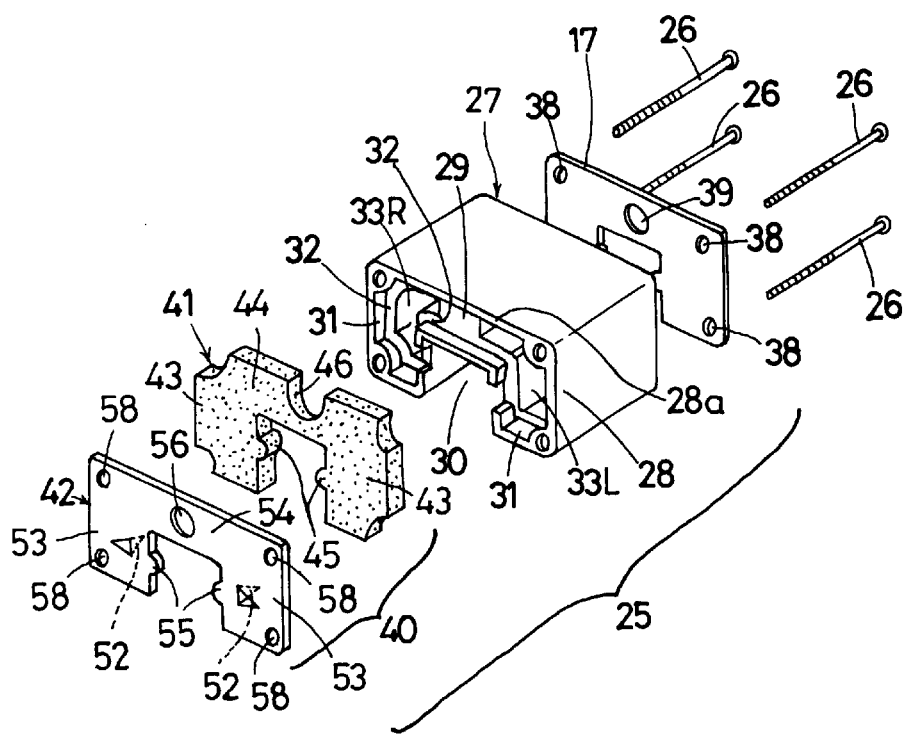
FIG. 4 is an exploded perspective view showing a lubricating means to be incorporated onto the linear motion guide unit shown in FIG. 1.

As apparent from FIG. 4, the lubricating means 25 is composed of a case 27 for storing lubricant therein, and a lubricating plate assembly 40 that is arranged so as to close an opening 31 of the case 27, which is formed facing the end cap 6. The lubricating plate assembly 40 consists of a lubricant-containing member 41 and a core metal 42 affixed to the member 41 to reinforce the same.

Figure 5:
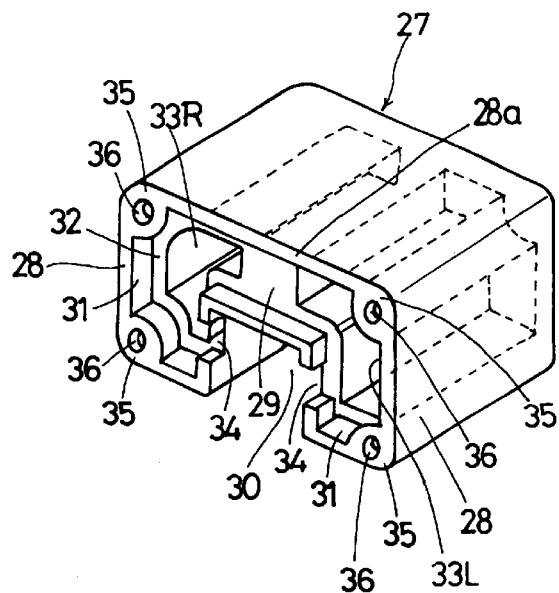
FIG. 5 is a perspective view showing a case for the lubricating means in FIG. 4.

The case 27, as shown in FIG. 5, has the contour substantially resembling a gate, which is entirely defined by a peripheral wall 28, in a plane crossing the lengthwise direction of the track rail 2. The case 27 is preferably made of synthetic resins from the viewpoint of workability and production cost. The case 27 has at the middle thereof a central partition 29 that connects the confronting sections of the peripheral wall 28 with each other. The case 27 is further formed with a recess 30, where the case 27 sits astride the track rail 2 when the lubricating means 25 is combined with the track rail 2. The case 27 is also made with the opening 31, where the lubricating plate assembly 40 may fit, on the end facing the associated end cap 6. The case provides therein a lubricant reservoir 33 that is made in smaller area in its cross-section than the opening 31 by shoulders 32 extending around the opening 31. The lubricant reservoir 33 is divided by the central partition 29 into a pair of reservoir halves 33R, 33L disposed on either side of the track rail 2 along which the slider moves linearly. The surround wall defining the opening 31 is partially cut out at areas 34 facing the raceway grooves on the track rail 2.

The reservoir halves 33R, 33L are positioned in symmetry on either side of the central wall 29 lying along a plane, or a center plane, which extends along the sliding direction of the case 27, namely, which includes the lengthwise center line of the case 27 to divide the case 27 into halves. Whether the lubricant reservoir 33 is made closed or open at its tail end opposite to the opening 31 has little significance. The open-ended lubricant reservoir 33 will be covered by the end seal 17 attached the case 27. Lubricant of grease or lubricating oil is charged in the reservoir halves 33R, 33L. Dividing the lubricant reservoir 33 into halves 33R, 33L is to help ensure the lubricant-containing plate 41 entirely soaks up the lubricant to thereby apply the lubricant evenly all over every raceway groove 4 even under such operating posture that the linear motion guide unit becomes turned sideways about the lengthwise direction of the track rail 2, where the raceway grooves 4, 4 on the lengthwise sides of the track rail 2 are laid one on another.

The case 27 for the lubricating means 25 is made thick at four corners 35 thereof, where there are bored holes 36 through which clamping bolts 26 may extend to connect the lubricating means 25 to any one lengthwise end of the case 5. In alignment with the holes 36 bored in the case 27, matching holes 38, 58 are made in the end seal 17 and the core metal 42 belonging to the lubricating plate assembly 40, which are arranged on the lengthwise opposite ends of the case 27, one to each end, in such a manner as to clamp the case 27 between them. It will be appreciated that this end seal 17 to be attached on the lubricating means 25 may be also made with a bore 39 for the grease nipple to make it possible to use it in common with the another seal 17, where the grease nipple 11 fits. By screwing the clamping bolts 26 into the threaded holes in the washer after extending through the holes 38, 36 and 58 made, respectively, in the end seal 17, the case 27 and the core metal of the lubricating plate assembly 40, which are overlaid one on another in the order mentioned just above, the lubricating means 25 is connected to the slider 1 through the washers 23, 24, with kept on clamped between the end cap 6 and the end seal 17. When more compressive strength is desired, collars 49, refer to FIG. 7, are preferably prepared in the holes 36 in the four thick corners 35 to make the squeezing force of the clamping bolts 26 sustain the washer 24.

The lubricating plate assembly 40 is designed so as to fit snugly in the opening 31 in the case 27. Namely, the lubricant-containing member 41 in the lubricating plate assembly 40 has a configuration substantially identical with that of the opening 31 and also has a thickness enough up to the shoulders 32 when fitted in the opening 31, which makes a releasing coupling. The lubricant-containing member 41, having come in snug fit inside the opening 31 with the back thereof being made in abutment against the shoulders 32, covers the opening 31 with the top being in flush with the end surface of the case 27, which is then shielded with the core metal 42. On this event, the lubricant-containing member 41 is mounted onto the case 27 to thereby lid the lubricant reservoir 33, where the lubricant stored in the reservoir 33 comes in direct contact with the member 41 and soaks into the same. With the slider 1 moving along the track rail 2, the lubricant-containing member 41 moves with respect to the track rail 2, keeping sliding contact with the raceway grooves 4 to thereby apply the lubricant onto the raceway grooves 4. The lubricant applied to the raceway grooves 4 flows into the opposing raceway grooves 9, thereby resulting in lubricating not only the raceway grooves 4, 9 but also the rolling elements running through between the confronting grooves 4, 9. Although but the lubricant in the plate 40 is consumed as the linear motion guide unit operates, the lubricant-containing member 41 in the lubricating plate assembly 40 may be constantly replenished with the lubricant stored in the case 27. The lubricant-containing member 41 will continue to apply the lubricant until it will spend all the lubricant, which is previously impregnated in the plate 41 and stored in the case 27.

Figure 6:
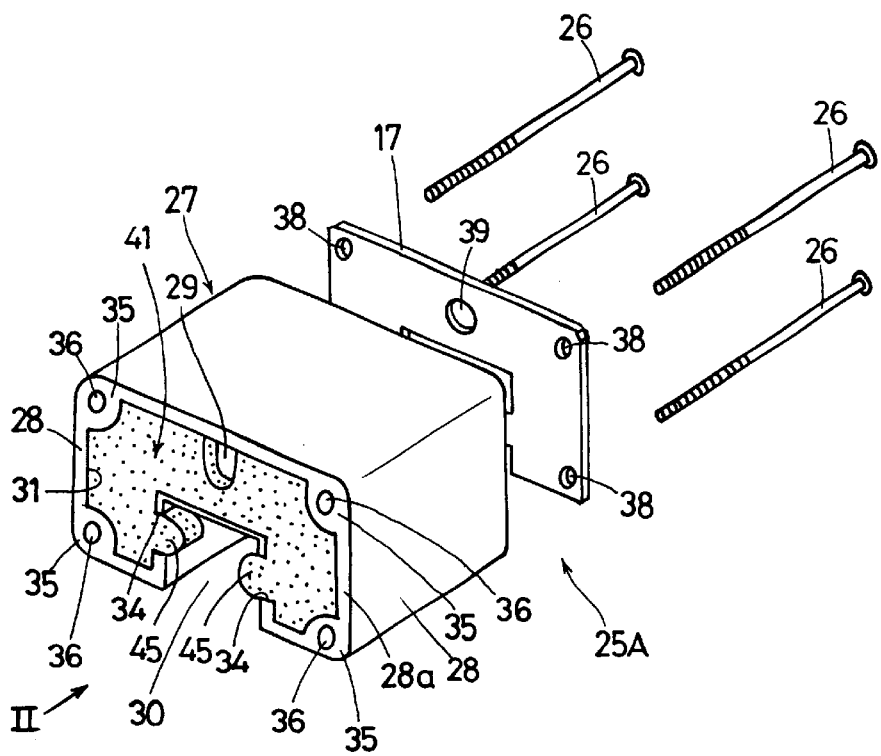
FIG. 6 is an exploded perspective view showing a second embodiment of the lubricating means in the linear motion guide unit of the present invention.
Figure 7:
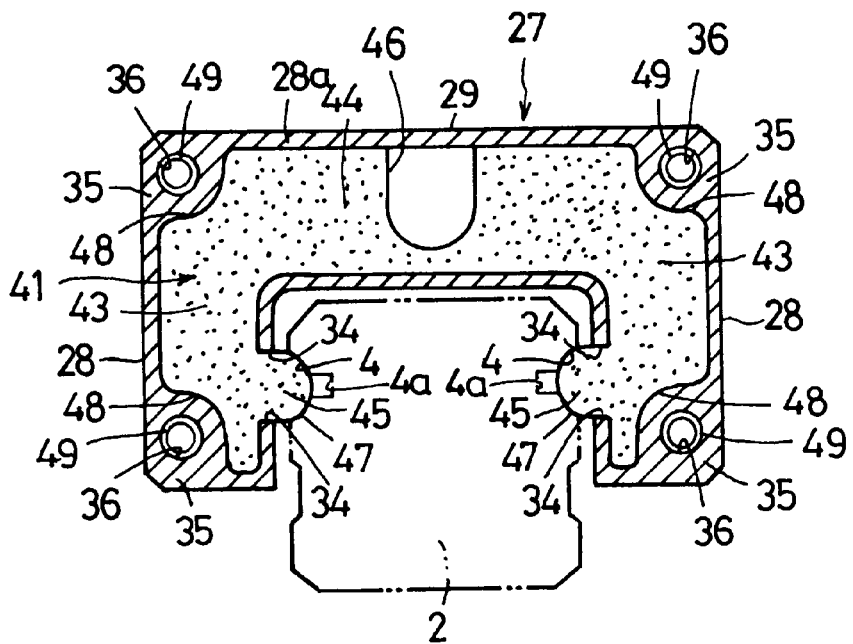
FIG. 7 is a front elevation of the lubricating means, viewed along an arrow II.

A second embodiment of the linear motion guide unit according to the present invention is shown in FIGS. 6 and 7, where like reference numerals designate identical or corresponding parts or components with that in FIGS. 1 to 5, so that the previous description will be applicable.

In this second embodiment, the component corresponding to the lubricating plate assembly described above is of only the lubricant-containing member 41 with no core metal. This lubricant-containing member 41 is comprised of a pair of side sections 43, 43 and a bridge section 44 connecting the side sections 43 to each other. The side sections 43 are each made with the convexities 45, which extends toward the associated raceway groove 4 on the track rail 2 through the area 34 where the surround wall defining the opening 31 is partially cut out. With the slider 1 with a lubricating means 25A being mounted on the track rail 2, the convexities 45 come in sliding contact with the raceway grooves 4 of the track rail 2 at their arced crests 47 to apply the lubricant contained in the member 41 onto the raceway grooves 4, thereby resulting in lubricating the raceway grooves 4. It will be understood that the detailed structure of the second lubricant-containing member 41 described just above may be applicable to the lubricant-containing member 41 according to the first embodiment.

The lubricant-containing member 41 in the lubricating means 25A, likewise with the first embodiment, is mounted onto the case 27 to close the lubricant reservoir 33, where the lubricant stored in the reservoir 33 comes in direct contact with the lubricant-containing member 41 and soaks into the same. With the slider 1 moving along the track rail 2, the lubricant-containing member 41 moves with respect to the track rail 2, keeping sliding contact with the raceway grooves 4 to thereby apply the lubricant onto the raceway grooves 4. The lubricant applied to the raceway grooves 4 flows into the opposing raceway grooves 9, thereby resulting in lubricating the rolling elements running through between the confronting grooves 4, 9. Although but the lubricant in the member 40 is consumed as it is applied onto the raceway grooves 4, the lubricant-containing member 41 in the lubricating plate assembly 40 may continue constantly replenished with the lubricant until it will spend all the lubricant, which is previously impregnated in the plate 41 and stored in the case 27.

The lubricant-containing member 41 to be attached on the lubricating means 25 may be provided at the bridge section thereof with a mouth 46 for the grease nipple to make it possible to use it in common with the another lubricant-containing plate to be incorporated in the lubricating plate assembly 15, where the grease nipple 11 fits. The lubricating means 25A has no need of the grease nipple and, therefore, the mouth 46 is left opened. Nevertheless, the central partition 29 of the case 27 blocks up the mouth 46 thereby keeps the lubricant against leakage out of the reservoir 33 through the mouth 46. Moreover, the lubricant-containing member 41 is recessed at its four corners 48 to snugly fit with the thick corners 35 of the case 27.

Figure 8:
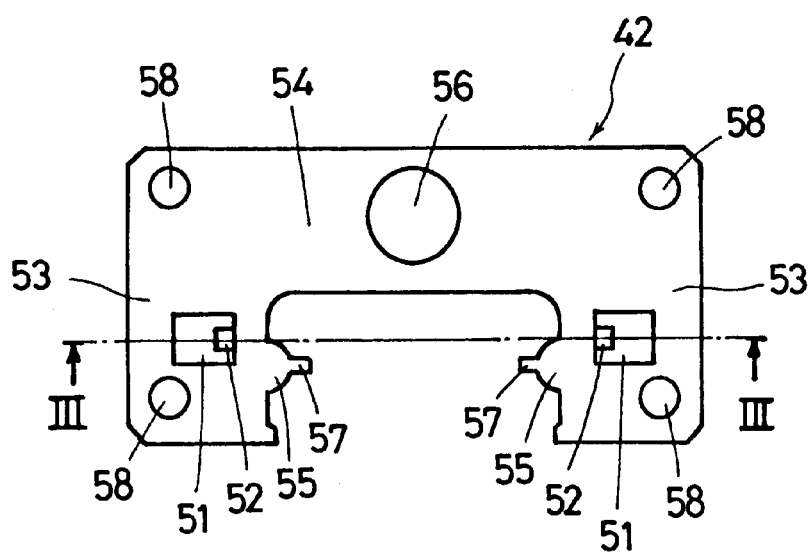
FIG. 8 is a front elevation showing an example of a core metal to be used for a lubricating plate assembly.
Figure 9:
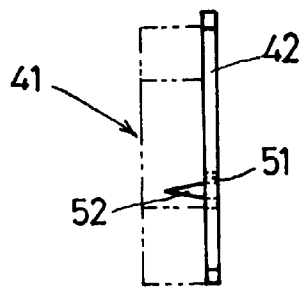
FIG. 9 is a side elevation of the core metal shown in FIG. 8.
Figure 10:
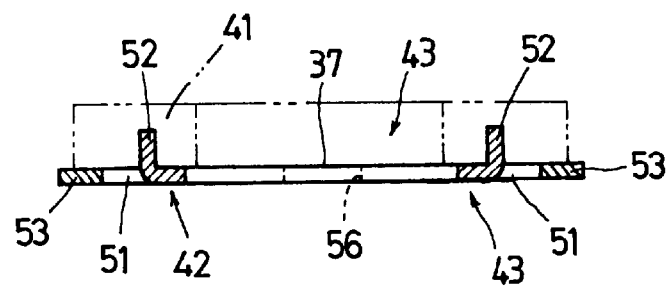
FIG. 10 is a cross section of the core metal in FIG. 8 and is taken on the plane of the line III—III of FIG. 8.

FIGS. 8 to 10 show in detail the core metal 42 used in the lubricating plate assembly 40 for the lubricating means 25 used incorporated in the linear motion guide unit according to the first embodiment of the present invention. The phantom lines in FIGS. 9 and 10 represent the lubricant-containing member 41.

The core metal 42 for the lubricating plate assembly 40 is designed in configuration so as to cover extensively all the top surface of the lubricant-containing member 41, which has been fitted in the opening 31 of the case 27, and the margin 28a of the peripheral wall 28, which surrounds around the member 41 and is in flush with the top surface of the member 41. The core metal 42 is of a metal sheet so formed as to have side sections 53 and a bridge section 54, which match the side sections 43 and the bridge section 44 of the lubricant-containing member 41.

Windows 51 are each formed in every side section 53 of the core metal 42 by punching out, where projections left partially in the windows are raised up to the side, on which a lubricant-containing member 41 is to be attached, and sharpened in the form of a spear or arrowhead, thereby providing piercing projections 52. The core metal 42 may be adhered to the sintered resinous component for the lubricant-containing member 41 by simply piercing it with the projections 52. By immersing the sintered resinous component, either before or after piercing it with projections 45, the lubricating plate assembly 40 may be easily produced, in which the lubricant-containing member 41 is fixed to the core metal 42. That is to say, the lubricant-containing member 41, after fixed to the core metal 42 with the piecing projections 52, is be attached on the opening 31 of the case 27. As an alternative, it may be allowed that the lubricant-containing member 41 alone covers the opening 31 of the case 27 and then the core metal is fixed onto the lubricant-containing plate 41 by piecing it with the projections 52. It will be understood that the projections 52 may be prepared by any method other than stamping out of the windows described just above, for example, by stamping out lugs in the core metal 42, which are then raised into the piecing projections, or by implanting pins on the core metal 42.

The side sections 53 of the core metal 42 are each provided with a raised portion 55 that is positioned in alignment with the associated convexity 45 of the lubricant-containing member 41. The raised portions 55 are each made somewhat less in height than the convexity 45 so as to make no engagement with the associated raceway groove 4 on the track rail 2, thereby supporting the associated convexity 45 of the lubricant-containing member 41 and thus keeping the convexity 45 against deformation. Each raised portion 55 is moreover made at the crest thereof with a protrusion 57 extending toward the groove bottom 4a, refer to FIG. 7, of the associated raceway groove 4 on the track rail 2 to the extent of not having to come in contact with the groove bottom 4a. The core metal 42 also has at its four corners matching holes for the clamping bolts 26, which are in alignment with the holes 36 in the case 27. Like the lubricant-containing member 41 to be attached on the lubricating means 25, the core metal 42 is provided at the bridge section 54 thereof with a mouth 56 for the grease nipple to make it possible to use it in common with the another core metal to be incorporated in the lubricating plate assembly 15, where the grease nipple 11 fits. The mouth 56 does not serve for the grease nipple when the core metal 42 is used in the lubricating means 25.

Figure 11:
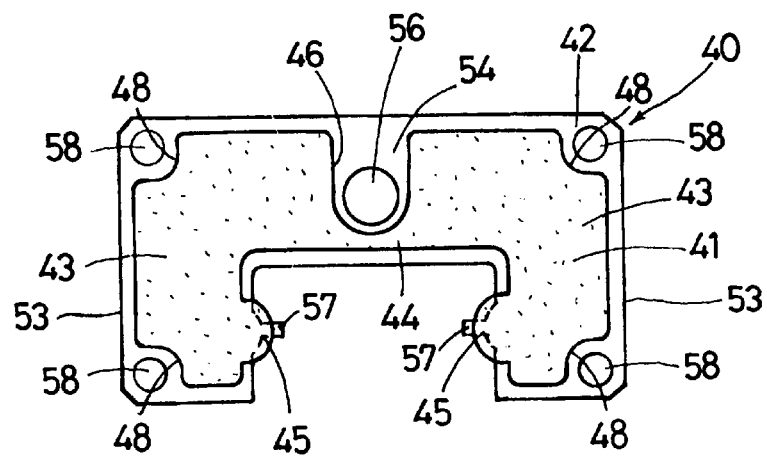
FIG. 11 is a front elevation showing a lubricating plate assembly in which a lubricant-containing plate is adhered onto the core metal.
Figure 12:
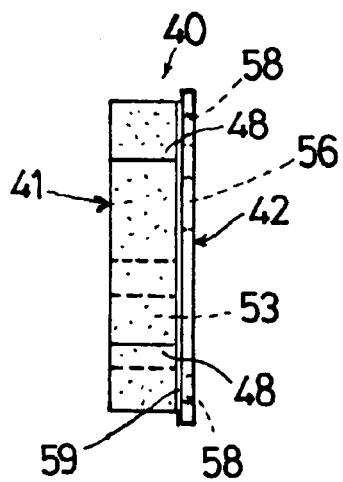
FIG. 12 is a side elevation of the lubricant-containing plate shown in FIG. 11.

As will be seen from FIGS. 11 and 12, the lubricating plate assembly 40 may be alternatively made by adhesion of the lubricant-containing member 41 to the core metal 42. Preferably, the lubricant-containing member 41 is made of a sintered resinous component of ultrahigh molecular weight polyethylene resin, which may be easily adhered to the core metal 42 by using the adhesive 59 of, for example, epoxy resin. Moreover, it is preferred that the sintered resinous component is impregnated with the lubricant after it has been fixed to the core metal 42 with the adhesive 59. In the embodiment shown, although the lubricant-containing member 41 is adhered over its entire surface to the core metal 42 with the adhesive 59, local adhesion neighboring the convexities 45 may be sufficient, where the lubricant-containing plate 41 comes in sliding contact with the raceway grooves 4. On this design of local adhesion in which the lubricant-containing member 41 is adhered to the rigid core metal 42 at only the area neighboring the convexities 45, even if the lubricant-containing member 41 is subject to the external force great to cause its deformation, the core metal 42 resists the deformation of the convexities 45 to keep the accuracy of their sliding surfaces with respect to the raceway grooves 4. As a result, the convexities 45 of the lubricant-containing member 41 are not urged excessively against the raceway grooves 4, nor are they spaced apart largely away from the raceway grooves 4. This makes it possible to incessantly apply the sufficient lubricant to the raceway grooves 4 with no increase of the sliding resistance to the raceway grooves 4.

Figure 13:
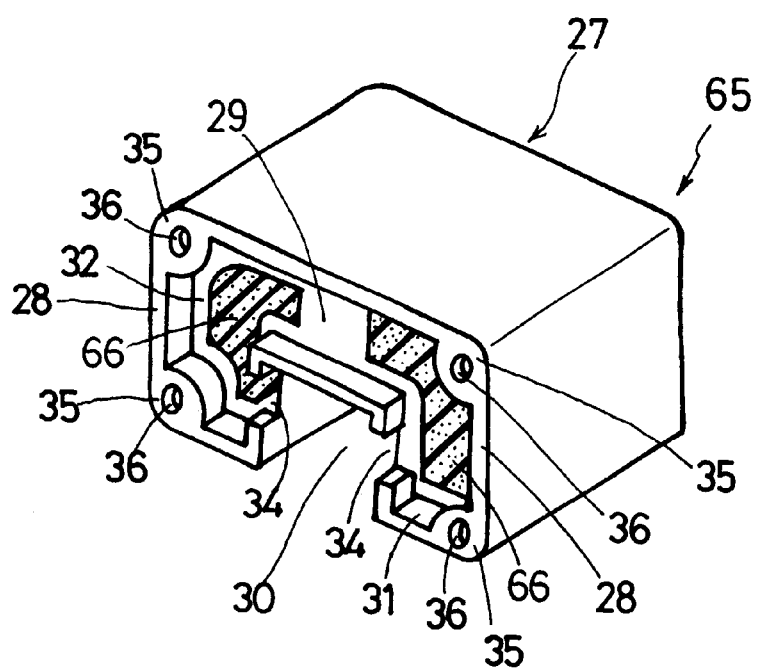
FIG. 13 is a perspective view showing a third embodiment of the lubricating means in the linear motion guide unit of the present invention, which is shown on assemblage.

FIG. 13 shows a third embodiment of the lubricating means to be incorporated in the linear motion guide unit of the present invention. A lubricating means 65 in FIG. 13 has a case substantially identical in structure with that in the first embodiment, for example the case in FIG. 5, and, therefore, like parts or components have been given the same reference characters, so that the previous description will be applicable.

A pair of reservoir halves 33R, 33L in the case 27 for the lubricating means 65 contains therein lubricant-storing mediums 66, each to each half, which are made of a material capable of reserving lubricant. Each lubricant-storing medium 66 is formed identical in cross section with any one of the reservoir halves 33R, 33L, so that the lubricant-storing mediums 66 may be charged in the reservoir halves 33R, 33L by simple insertion lengthwise of the halves.

The lubricant-storing mediums 66 are to help ensure the incessant application of the desired amount of lubricant with no causing lubrication failure, in spite of the high-speed reciprocating motion of the slider 1 and the posture of the linear motion guide unit. Thus, the lubricant-storing mediums 66 should be made of any one of powdery ultrahigh molecular weight synthetic resins, porous elastic bodies of high molecular weight, sintered porous resins of high polymer, felts, urethane forms and the like. The lubricating plate assembly 40 is, likewise with that in the first embodiment, mounted onto the case 27 to close the opening 31 of the case 27. The lubricant-containing member 41, having fitted in the opening 31, comes in contact with the lubricant-storing mediums 66 accommodated in the lubricant reservoir 33 of the case 27, whereby the member 41 may be replenished with the lubricant from the lubricant-storing mediums 66. That is to say, the lubricant reserved largely in the lubricant-storing mediums 66 is supplied to the lubricant-containing member 41 to thereby compensate the amount of lubricant applied to the raceway grooves 4 through the convexities 45 of the lubricant-containing member 41, which are kept in sliding engagement with the raceway grooves 4 on the track rail 2. It will be thus understood that the lubricating plate assembly 40 may continue to apply the lubricant to the raceway grooves 4 on the track rail 2 with a maintenance free of long service life until the lubricant reserved in the lubricant-storing mediums 66 is used up completely.

The reservoir 33 in the case 27 may be charged with lubricant, either alone or mixed with any adjunctive agent. The lubricant adapted to be charged alone is, for example, lubricating oil or grease, which may be stored in the reservoir 33 in fluidic condition. Among the lubricants, lubricating oil may be mixed with at least any one of powdery resins, pulverized metals and felts to regulate the fluidity. On the other hand, it is to be noted that the grease of high viscosity is undesired because of difficult permeation of the lubricant in the lubricant-containing member 41. It is thus preferred to employ the grease low in consistency, for example, lithium grease.

The lubricant-containing member 41 is of a sintered resinous component, or sintered porous body of high molecular polymers, having a porous structure including therein continuous voids, which is produced by filling a preselected mould with the powdery ultrahigh molecular weight polyethylene resin having the grading of, for example, either fine grain size of 30 $\mu$m or coarse grain size of from 250 $\mu$m to 300 $\mu$m, and then heating the molded resin under high pressure. The sintered resinous component of porous structure has the function of oozing little by little and smoothly the lubricant that has been stored in the voids of the sintered component. The sintered resinous component is fabricated by pressing the fine powder of synthetic resins in the mould under high temperature and, therefore, it is superior in workability and wear-proof and further it may be produced inexpensively. Aporous sintered body of high polymers is a typical example of the sintered resinous component suitable for embodying this invention. The sintered resinous component for the lubricant-containing member 41 preferably has the porous structure of the porosity of, for example, from 40% to 50%. It will be understood that a sintered resinous component for the lubricant-containing plate assembly 15 is also produced by forming the fine powder of ultrahigh molecular weight polyethylene under high pressure and high temperature, likewise with the lubricant-containing plate 41.

The lubricant-containing member 41 is prepared by immersing the porous sintered resinous component with turbine oil for the lubricating oil thereby impregnating the voids with the lubricating oil. Dipping the sintered resinous component into, for example, turbine oil for about 30 minutes may provides the lubricant-containing member 41 that is regulated at percentage of lubricating oil content of 41% by weight and thus at oil content of about 2 cc. Percentage of lubricating oil content may be controlled in accordance with the operating condition of the slider 1. Preferable combination of the lubricant and the sintered resinous component may be selected from materials other than that described just above and, thus, the modification in specification may be allowed with relative ease. The sintered resinous component for the lubricant-containing member 41 may be easily formed with high accuracy of finishing within, for example, about ±0.025 mm. This makes it possible to provide the component that is most suitable for the linear motion guide units incorporated into the precision machines.

With the track rail 2 having mounted with the slider 1 having the lubricating means 25, 25A or 65, the lubricant-containing member 41 is brought into engagement with the raceway grooves 4 of the track rail 2 at the convexities 45 thereof that are exposed out of the case 27 against the raceway grooves 4. The raceway grooves 4 on the track rail 2 are made to have the arced cross section so that the protrusions 57 of the core metal 42 do not come in contact with the raceway grooves 4, but extend near the grooves bottoms 4a of the raceway grooves 4. As the slider 1 moves along the track rail 2, the lubricant charged in the lubricant reservoir 33 in the case 27, or grease, lubricating oil or oily substance contained in lubricant-storing medium, is fed incessantly to the lubricant-containing plate 41, where the lubricant is applied little by little continuously to the raceway grooves 4 of the track rail 2 through convexities 45. The lubricant applied onto the raceway grooves 4 spreads therefrom over the rolling elements 7 and the raceway grooves 9 to help ensure the smooth run of the rolling elements 7 whereby the slider 1 makes the smooth sliding movement along the track rail 2.

According to the present invention, in addition to the lubricant contained previously in the lubricant-containing member 41, much lubricant charged in the reservoir 33 of the case 27 helps ensure the maintenance-free lubrication of the raceway grooves 4 of the track rail 2 for a prolonged service life.

Having described specific embodiments of the linear motion guide unit of the present invention, it is believed obvious that the invention may be practiced otherwise than as specifically described above.

The case 27 for the lubricating means 25, although having been described mounted on the slider 1 in the first embodiment, may be attached to a mount that is connected to the slider 1 to move in unison with the slider 1. While the opening 31 of the case 27 has been described as the releasing coupling defined by the shoulder 32, other modifications may be employed so long as the lubricant may be kept against leakage. Moreover, although the washers 23, 24 have been shown used to mount the lubricating means 25, 65 to the slider 1, the washers 23, 24 may be eliminated to mount directly the lubricating means to the casing 5 of the slider 1. As an alternative, the lubricant-containing member 41 may be varied locally in porosity. For example, the convexities 45 coming in sliding contact with raceway grooves 4 are made rich in porosity, whereas the residual portions are made less in porosity. Thus, the lubricant flows easily from the porosity-less portions to the convexities rich in porosity so that the raceway grooves 4 may be replenished smoothly with the lubricant. The rolling elements incorporated in the slider are either balls or rollers.

The linear motion guide unit of the present invention helps ensure the smooth sliding movement and also is suitable for the facilities where the escaped lubricant should be disposed without delay, such as clean rooms for semiconductor manufacturing machines where the operating environment should be prevented from the pollution with oil, food facilities where the oily material should be flushed away, and wood working facilities where dust absorbs oily material. The guide unit of the present invention may achieve good lubrication for long service life with maintenance-free expect the replenishment of lubricant.

While the present invention has been described in its preferred embodies, it is to be understood that the words which have been used are words of description rather then limitation and that changes within the purview of the appended claims may be made without departing from the true scope and spirit of the invention in its broader aspect.

What is claimed is:

1. A linear motion guide unit comprising a track rail provided at lengthwise side surfaces thereof with first raceway grooves, a sliding element movable with relative to the track rail and having second raceway grooves confronting the first raceway grooves, and lubricating means for lubricating the confronting first and second raceway grooves, wherein the lubricating means is comprised of a case provided therein with a lubricant reservoir containing lubricant and riding the track rail astride, and a lubricating plate assembly having a lubricant-containing member that is mounted on the case to lid the lubricant reservoir and comes in sliding contact with the first raceway grooves, so that the lubricant contained in the lubricant-containing member is applied to the first raceway grooves while the lubricant-containing member is replenished with the lubricant in the lubricant reservoir, wherein the case has an opening facing the lubricant reservoir at fore-and-aft one end of the sliding element, and the lubricant reservoir is closed with the lubricating plate assembly fitted to the opening.

2. A linear motion guide unit constructed as defined in claim 1, wherein shoulders are provided between the opening and the reservoir to make the reservoir smaller than the opening, where a releasing coupling is provided to fit the lubricating plate assembly.

3. A linear motion guide unit constructed as defined in claim 1, wherein the lubricant reservoir in the case is divided into reservoir halves that are positioned in correspondence with the first raceway grooves of the track rail on either side of a plane extending along a reciprocating direction of the sliding element.

4. A linear motion guide unit constructed as defined in claim 3, wherein the reservoir halves are formed in substantially symmetry with respect to a central plane, which extends along the reciprocating direction of the sliding element.

5. A linear motion guide unit constructed as defined in claim 1, wherein the case is made of synthetic resin.

6. A linear motion guide unit constructed as defined in claim 1, wherein the lubricating plate assembly includes a lubricant-containing member of porous structure.

7. A linear motion guide unit constructed as defined in claim 6, wherein the lubricating plate assembly includes a core metal adhered to the lubricant-containing member at a surface thereof opposing to the side of the lubricant reservoir.

8. A linear motion guide unit constructed as defined in claim 7, wherein the lubricant-containing member is adhered onto the core metal by piercing pins made on the core metal.

9. A linear motion guide unit constructed as defined in claim 7, wherein the lubricant-containing member is affixed onto the core metal by adhesive.

10. A linear motion guide unit constructed as defined in claim 6, wherein the lubricant-containing member is of a sintered porous resinous component, which is fabricated by heating finely powdered synthetic resin of ultrahigh molecular weight polymers under pressure in a design mould.

11. A linear motion guide unit constructed as defined in claim 1, wherein the lubricant-containing member has convexities that extend through cut-away areas formed at the opening of the case and come in sliding contact with the first raceway grooves on the track rail.

12. A linear motion guide unit constructed as defined in claim 1, wherein the reservoir of the case contains therein the lubricant in the form of any one of fluidic condition and a condition where the lubricant is held in lubricant-storing medium.

13. A linear motion guide unit constructed as defined in claim 12, wherein the lubricant contained in the reservoir of the case is any one of grease and lubricating oil.

14. A linear motion guide unit constructed as defined in claim 12, wherein the fluidic lubricant contained in the reservoir of the case is mixed with any one selected from powdery resins, pulverized metals and felts.

15. A linear motion guide unit constructed as defined in claim 1, wherein the lubricating means is mounted on any one of the sliding element and a mount that is fixed to the sliding element in unison.

16. A linear motion guide unit constructed as defined in claim 1, wherein the sliding element includes a casing having the second raceway grooves, rolling elements running through between the confronting first and second raceway grooves, and end caps and end seals connected onto the opposite ends of the casing, while the lubricating means is clamped arranged between the associated end cap and end seal.

\* \* \* \* \*